United States Patent
Bosch Ruiz et al.

(10) Patent No.: US 10,459,561 B2
(45) Date of Patent: Oct. 29, 2019

(54) USING CAPACITANCE TO DETECT TOUCH PRESSURE

(71) Applicant: QUALCOMM Incorporated, San Diego, CA (US)

(72) Inventors: Marc Bosch Ruiz, San Clemente, CA (US); Galit Hofree, San Diego, CA (US); Robert Scott Tartz, San Marcos, CA (US); Robyn Teresa Oliver, San Diego, CA (US); Jonathan Karl Kies, Encinitas, CA (US); Virginia Walker Keating, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 430 days.

(21) Appl. No.: 14/795,699

(22) Filed: Jul. 9, 2015

(65) Prior Publication Data

US 2017/0010732 A1 Jan. 12, 2017

(51) Int. Cl.
| G06F 3/044 | (2006.01) |
| G06F 3/041 | (2006.01) |
| G06F 3/0488 | (2013.01) |
| G06K 9/62 | (2006.01) |

(52) U.S. Cl.
CPC ............ *G06F 3/0416* (2013.01); *G06F 3/044* (2013.01); *G06F 3/0412* (2013.01); *G06F 3/0488* (2013.01); *G06K 9/6228* (2013.01); *G06F 2203/04111* (2013.01); *G06F 2203/04808* (2013.01)

(58) Field of Classification Search
CPC ........... G06K 9/6228; G06F 2203/0411; G06F 2203/04808

USPC ........................................................ 345/174
See application file for complete search history.

(56) References Cited

U.S. PATENT DOCUMENTS

| 2007/0189611 A1* | 8/2007 | Yang | G06K 9/6278 |
| | | | 382/228 |
| 2008/0187909 A1* | 8/2008 | Dai | C12Q 1/6886 |
| | | | 435/6.12 |
| 2010/0039393 A1* | 2/2010 | Pratt | G06F 3/0236 |
| | | | 345/173 |
| 2010/0076850 A1* | 3/2010 | Parekh | G06Q 30/0269 |
| | | | 705/14.66 |
| 2010/0103139 A1* | 4/2010 | Soo | G06F 3/0416 |
| | | | 345/175 |

(Continued)

FOREIGN PATENT DOCUMENTS

EP 2825938 A1 1/2015

OTHER PUBLICATIONS

International Search Report and Written Opinion—PCT/US2016/036948—ISA/EPO—dated Aug. 22, 2016.

(Continued)

*Primary Examiner* — Carolyn R Edwards
(74) *Attorney, Agent, or Firm* — Kilpatrick Townsend & Stockton/QUALCOMM Incorporated

(57) ABSTRACT

Aspects of the disclosure are related to a method for determining a touch pressure level on a touchscreen, comprising: detecting a touch event by the touchscreen; obtaining data relating to features associated with the touch event comprising a capacitance value, a touch area, and/or a touch duration; and determining a touch pressure level based on one or more of the features.

26 Claims, 8 Drawing Sheets

(56) References Cited

U.S. PATENT DOCUMENTS

| | | | | |
|---|---|---|---|---|
| 2010/0205190 | A1* | 8/2010 | Morris | G06F 3/041 707/758 |
| 2010/0225595 | A1* | 9/2010 | Hodges | G06F 3/041 345/173 |
| 2010/0280403 | A1* | 11/2010 | Erdogmus | A61B 5/0484 600/545 |
| 2011/0050394 | A1* | 3/2011 | Zhang | G06F 3/045 340/5.82 |
| 2011/0243445 | A1* | 10/2011 | Uzelac | G06K 9/342 382/177 |
| 2011/0282828 | A1 | 11/2011 | Precup et al. | |
| 2012/0169636 | A1* | 7/2012 | Liu | G06F 3/0412 345/173 |
| 2013/0120282 | A1* | 5/2013 | Kukulski | G06F 3/04883 345/173 |
| 2013/0201155 | A1* | 8/2013 | Wu | G06F 3/03547 345/174 |
| 2014/0009433 | A1* | 1/2014 | Chen | G06F 3/044 345/174 |
| 2014/0071049 | A1 | 3/2014 | Min | |
| 2014/0188561 | A1 | 7/2014 | Tenbrock et al. | |
| 2014/0237356 | A1 | 8/2014 | Durga et al. | |
| 2014/0354584 | A1 | 12/2014 | Cok et al. | |
| 2014/0372351 | A1* | 12/2014 | Sun | G06N 99/005 706/12 |
| 2015/0002405 | A1* | 1/2015 | Kuan | G06F 3/041 345/173 |
| 2015/0042582 | A1* | 2/2015 | An | G06F 3/0421 345/173 |
| 2015/0077323 | A1* | 3/2015 | Ramaswamy | G06F 3/012 345/156 |
| 2015/0138124 | A1* | 5/2015 | Wang | G06F 3/0488 345/173 |
| 2015/0153887 | A1* | 6/2015 | Kim | G06F 3/044 345/173 |
| 2016/0179245 | A1* | 6/2016 | Johansson | G06F 3/0414 345/174 |
| 2016/0357301 | A1* | 12/2016 | Padiri | G06F 3/0416 |

OTHER PUBLICATIONS

Chang W., et al., "Recognition of Grip-Patterns by Using Capacitive Touch Sensors," In Proceedings International Symposium on Industrial Electronics (ISIE2006), Jul. 9-12, 2006, DOI: 10.1109/ISIE.2006.296083, XP055049941, pp. 2936-2941.

Kolly S.M., et al., "A Personal Touch: Recognizing users based on Touch Screen Behavior," Proceedings of the Third International Workshop on Sensing Applications on Mobile Phones, 2012, 5 pages.

* cited by examiner

USING CAPACITANCE TO DETECT TOUCH PRESSURE

FIELD

The subject matter disclosed herein relates to electronic devices, and more particularly to methods, apparatuses, and systems for use in and/or with touchscreen data.

BACKGROUNDS

A touchscreen implemented with a conventional touchscreen controller only provides the position (i.e., the coordinates) and the duration of the touch events to the processor of the device.

On the other hand, certain operations are cumbersome to perform on a user interface that relies on a conventional touchscreen as the main input device. For example, it may be cumbersome to enter capital letters, or letters with diacritical marks, such as accented letters, with an on-screen keyboard displayed on a touchscreen. A user may need to press the Shift key, the Caps Lock key, or the like, on an on-screen keyboard, or may need to press and hold on a character to view character options. It may also be cumbersome to enter complex non-Latin characters, such as certain Asian characters, with an on-screen keyboard on a touchscreen. A user may need to enter specific input modes to be able to enter such complex characters.

As a further example, touchscreen-based user interfaces lack the equivalents of the mouse-over or right-click operations commonly found on pointer-and-cursor-based user interfaces. Therefore, invoking context menus or help texts may be cumbersome on a touchscreen-based user interface.

As a further still example, visually impaired users may find it difficult to operate touchscreen user interfaces when they need to enter texts or select menu items. The conventional double-tap feature (the user interface provides an auditory announcement of the menu item at a single-tap, and registers the item selection only at a double-tap) may be helpful but is still cumbersome to use.

Moreover, certain operations commonly performed on touchscreen-equipped electronic devices leave room for improvement. For example, 4-digit Personal Identification Numbers (PINs) commonly used with mobile devices are unsecure because of their short length and small symbol set. These 4-digit PINs are prone to brute-force guessing, shoulder surfing, or guessing based on smudges left on the glass surface of the touchscreen.

Therefore, methods implemented with a touchscreen for improving the user experience for any of the above-described operations may be desirable.

SUMMARY

One aspect of the disclosure is related to a method for determining a touch pressure level on a touchscreen, comprising: detecting a touch event by the touchscreen; obtaining data relating to features associated with the touch event comprising a capacitance value, a touch area, and/or a touch duration; and determining a touch pressure level based on one or more of the features.

DETAILED DESCRIPTION

Figure 1:
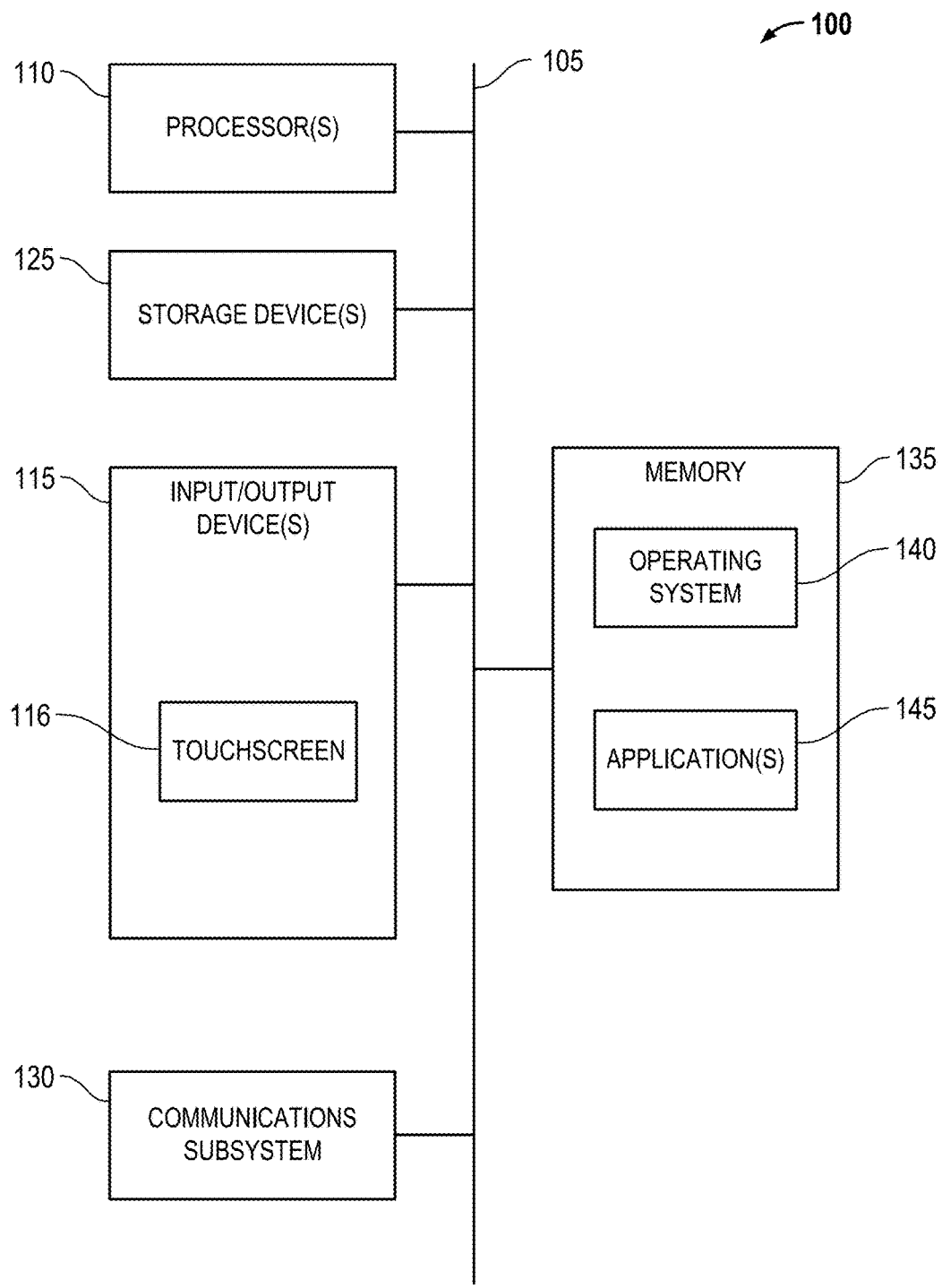
FIG. 1 illustrates an embodiment of a touchscreen-equipped device with which embodiments of the disclosure may be practiced.

An example device 100 adapted for determining touch pressure levels on a touchscreen is illustrated in FIG. 1. The device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input/output devices 115, which include at least a touchscreen 116, and can further include without limitation a mouse, a keyboard, a speaker, a printer, and/or the like. The touchscreen 116 may be a capacitive touchscreen.

The device 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The device 100 might also include a communication subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other computer systems/devices, and/or any other devices described herein. In many embodiments, the device 100 will further comprise a working memory 135, which can include a RAM or ROM device, as described above.

The device 100 also can comprise software elements, shown as being currently located within the working memory 135, including an operating system 140, device drivers, executable libraries, and/or other code, such as one or more application programs 145, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computer device, such as the device 100. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computerized device 100 and/or might take the form of source and/or installable code, which, upon compilation and/or installation on the device 100 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Embodiments of the disclosure are directed to detecting touch pressure levels on a touchscreen based on raw touch data, which may include a capacitance value associated with a touch event, a touch area of a touch event, and/or a touch duration of a touch event. Each of the capacitance value, the touch area, and the touch duration may be hereinafter referred to as a feature. For different users, different features work better for determining the touch pressure level. Therefore, the features may be weighted with a particular set of weights for an individual user with the weights customized for the individual user.

A capacitive touchscreen, such as the touchscreen 116, comprises an insulator such as glass, coated with a transparent conductor on one side. As the human body is also an electrical conductor, touching the surface of the screen on the other side of the insulator results in measurable changes in capacitances. Different methods may be used to determine the location of the touch.

It should be noted that a conventional touchscreen controller only provides the position, i.e., the coordinates, and the duration of the touch events. Therefore, necessary hardware and/or software modifications may be required to enable a device, such as the device 100, to receive raw touch data related to all the features. The modifications may be made in a number of ways. For example, in one embodiment, the digitized outputs of the analog front-end (AFE) of the touchscreen 116 may be directly fed into the processor 110 without the use of a conventional touchscreen controller. Coupled with proper software or firmware, the processor 110 may be able to process such raw touchscreen data to obtain feature data/measurements and determine touch pressure levels. In another embodiment, the touchscreen controller may be modified such that it provides the detected capacitance values (and possibly the area and shape of the touch region) in addition to the position and the duration of the touch event to the processor 110.

Figure 2:
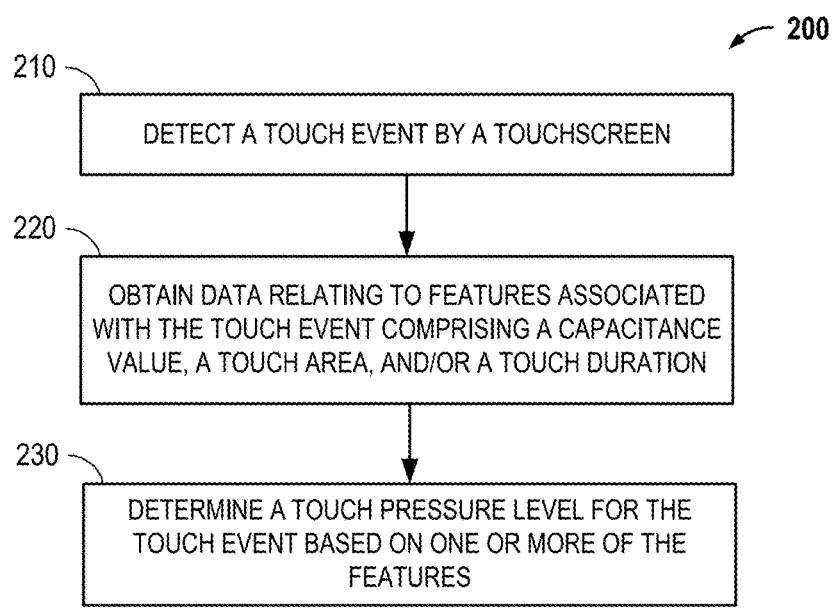
FIG. 2 is a flowchart illustrating an exemplary method for determining a touch pressure level on a touchscreen.

FIG. 2 is a flowchart illustrating an exemplary method 200 implemented with the device 100 for determining a touch pressure level on a touchscreen. At block 210, a touch event may be detected by the touchscreen 116. Any physical contact detectable by the touchscreen 116 may be a touch event. Next, at block 220, data relating to features associated with the touch event comprising a capacitance value, a touch area, and/or a touch duration is obtained. The capacitance value may be a normalized average capacitance value, e.g., a value indicative of an average capacitance per unit area within the touch area, such as the average capacitance per pixel area within the touch area. The average capacitance value may be determined by a touchscreen controller adapted for determining and providing such normalized average capacitance values. Alternatively, the average capacitance value may be determined by the processor 110 of the device 100 by processing digitized raw touch data received from the touchscreen 116 or from a component coupled to the touchscreen 116. One method for determining an average capacitance value is to average measured capacitance values that are above a predetermined threshold. At block 230, a touch pressure level may be determined based at least on one or more of the features. As will be described below, the average capacitance value associated with a touch event may be positively correlated with the touch pressure level and therefore may be useful in determining the touch pressure level. The average capacitance may be fused with other data relating to the touch event, such as the area of the touch region and duration of the touch event, in the determination of the touch pressure level. One embodiment where the touch pressure level is determined based on the average capacitance, the area of the touch region, and the duration of the touch event will be described in detail below. Different levels of touch pressure may be recognized in different embodiments. For example, in one embodiment, the touch pressure may be classified into three levels: light, natural, and firm.

As a user touches the touchscreen 116 with different pressure levels, the average capacitance value per unit area within the touch area may differ accordingly. The correlation may be explained by one or more of the following reasons. First, a higher touch pressure may squeeze more sweat out of the eccrine sweat gland ducts, thereby causing a higher average capacitance value associated with the touch event. Second, a higher touch pressure may flatten out the portion of the finger that is in contact with the touchscreen and therefore may increase the amount of skin that is in contact with the touchscreen (e.g., valleys between the epidermal ridges of the fingerprint). As a result, the average capacitance value associated with the touch event may also increase. Therefore, the average capacitance value may be positively correlated with the touch pressure level.

Figure 3A:
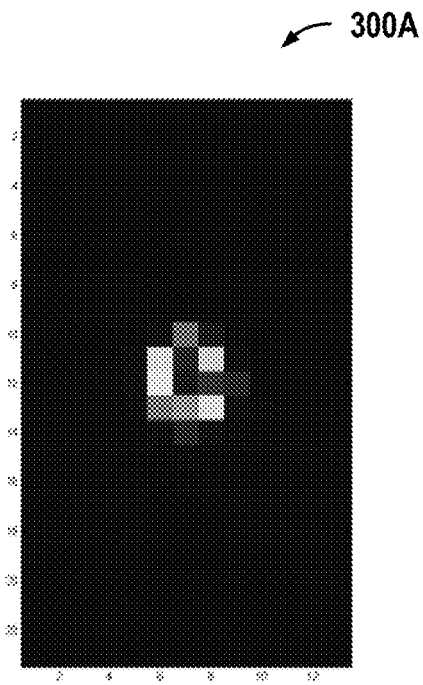
FIG. 3A illustrates a plot of exemplary touchscreen output data corresponding to a light touch.
Figure 3B:
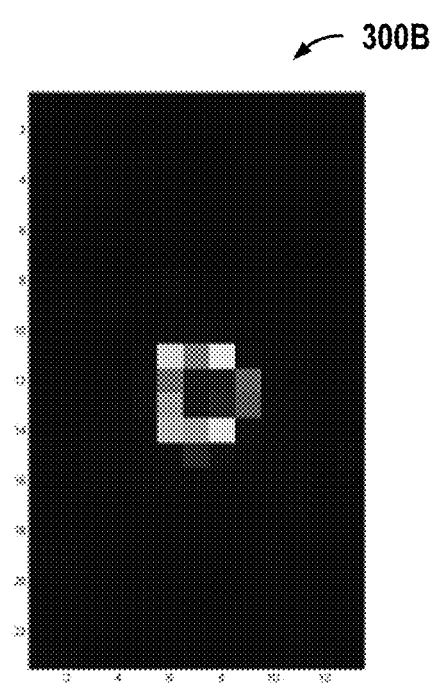
FIG. 3B illustrates a plot of exemplary touchscreen output data corresponding to a natural touch.
Figure 3C:
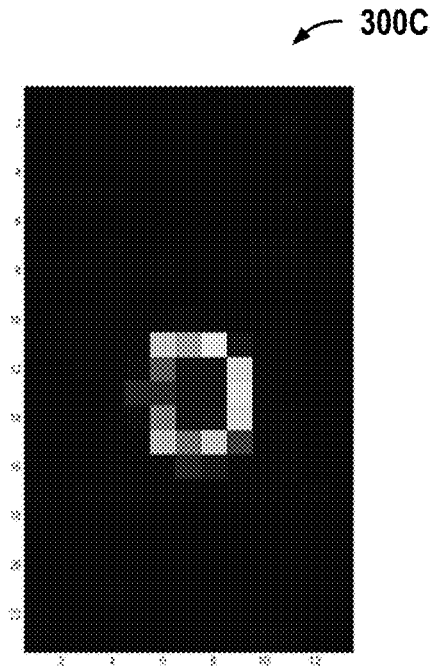
FIG. 3C illustrates a plot of exemplary touchscreen output data corresponding to a firm touch.

FIGS. 3A-3C illustrate plots 300A, 300B, and 300C of exemplary touchscreen output data corresponding to touch events with different pressure levels. In particular, FIG. 3A illustrates a plot 300A of exemplary touchscreen output data corresponding to a light touch; FIG. 3B illustrates a plot 300B of exemplary touchscreen output data corresponding to a natural touch; and FIG. 3C illustrates a plot 300C of exemplary touchscreen output data corresponding to a firm touch. In addition to the apparent differences in the area of the touch regions, different average capacitance levels (not shown) may be observed among touch events associated with FIGS. 3A-3C. For example, the average capacitance value associated with the firm touch corresponding to the plot 300C of FIG. 3C may be observed as being approximately 1.1 times the average capacitance value associated with the natural touch corresponding to the plot 300B of FIG. 3B, and the latter may be observed as being approximately 1.2 times the average capacitance value associated with the light touch corresponding to the plot 300A of FIG. 3A. Of course, the numerical relationships described above do not limit the disclosure.

The touch pressure level adds another dimension to the touch user interface input. Otherwise cumbersome operations on the touch user interface may be simplified by enabling the detection of touch pressure levels.

For example, different touch pressure levels may be used to facilitate text entry. The device 100 may be adapted so that a particular touch pressure level may invoke a pop-up menu that provides access to a capital letter, one or more characters with diacritical marks, digits, or strokes/glyphs of a complex character such as in some Asian languages. As a non-limiting example, a user may type in the letter "a" with an on-screen keyboard on the touchscreen 116 and make a firm touch on the letter "a" on the touchscreen 116. Then the device 100 may recognize the firm touch pressure level and generate a pop-up menu which allows the user to replace the letter "a" with the capital letter "A." In another non-limiting example, the user may touch the letter "a" on the touchscreen 116 with a light touch after typing in the letter "a." The device 100 then may recognize the light touch pressure level and provide a pop-up menu that allows the user to replace the letter "a" with either of the letters "à" and "á." In another embodiment, a particular touch pressure level may trigger a copy/cut/paste mode when the device 100 is in a text-viewing/editing mode.

As a further example, touch pressure levels may be used to enhance the security of short numerical PINs by adding another dimension to such PINs. Each symbol of a PIN may then be a combination of a digit and one or more particular touch pressure levels. For example, instead of a conventional numerical PIN 1-2-3-4, a PIN enhanced with touch pressure levels may be 1 (with a firm touch)—2 (with a light touch)—3 (with a firm touch)—4 (with a light touch). The security of the PINs is enhanced because the size of the symbol set from which symbols of the PINs may be selected is enlarged. Of course, the security of alphanumerical passwords may be similarly enhanced with touch pressure levels.

In another embodiment, touch pressure levels may be used to provide additional security for the authorization or confirmation of financial transactions, purchases, or other sensitive actions. For example, the device 100 may be adapted so that a "confirm" button or a similar button on a pressure-sensitive touchscreen user interface, the activation of which completes a sensitive action, may only be pressed or activated with a firm touch. To further increase security, the fact that the user interface button may only be activated with a particular touch pressure level need not be advertised on the user interface.

As yet another example, different touch pressure levels may be used to invoke context menus, help texts, or other functions. In a non-limiting exemplary embodiment, a user may touch an icon on the pressure-sensitive touchscreen user interface with a firm touch to invoke a context menu that provides access to such functions as move and delete. In other embodiments, different touch pressure levels may be used to invoke, for example, a menu showing bookmarked addresses or recently accessed addresses in a browser application run on the device 100. Different touch pressure levels may further be used to invoke, for example, help texts or short explanations for icons or other user interface elements, or an alternative text in a different language. In yet another embodiment, a user may use different touch pressure levels to zoom or pan on a picture or a map.

Furthermore, different touch pressure levels may be used to assist visually-impaired users in using mobile devices, such as the device 100. For example, a visually-impaired user may use firm touches to invoke auditory announcements while using natural touches to select or otherwise interact with touchscreen user interface elements.

In one embodiment of the disclosure, a touch pressure level associated with a touch event may be determined based on one or more of the capacitance measured in the touch region, the area of the touch region, and the duration of the touch event. It should be appreciated that dedicated pressure sensors are not required for the determination of the touch pressure level according to the disclosure hereinafter. The pressure level may be determined with different granularity levels based on the use scenarios. For example, in some use scenarios, a two-level pressure level (e.g., tap vs. press) detection may be sufficient; in some other use scenarios, a three-level pressure level (e.g., light/natural/firm) detection may be desirable; and in still other use scenarios, distinguishing between more than three pressure levels may be required. For example, a drawing application may benefit from very fine-grained touch pressure level determination and may apply a progressively thicker brush stroke when the user presses more firmly. It should be appreciated that there is a tradeoff between the granularity level and detection confidence. In other words, a coarser (e.g., less sensitive) determination may have a higher confidence level, and a finer-grained (e.g., more sensitive) determination may have a lower confidence level.

Due to differences in finger size, strength, past experiences, etc., people vary in how they touch a touchscreen. Therefore, the touch pressure level may be determined based on individually-trained classifiers to account for the variability between people. As described above, the touch pressure level and the average capacitance measured in the touch region may be positively correlated. Moreover, the touch pressure level and the area of the touch area may also be positively correlated because a firmer touch tends to flatten the finger in contact with the touchscreen and increase the area of the touch region. Furthermore, the touch pressure level and the duration of the touch event may be positively correlated as well due to a psychological association between touch pressure and duration. Therefore, fusing the three features in the touch pressure level determination may increase the robustness of the determination to variability in touch behavior when compared with using only one of the three features. However, it should be appreciated that fusing the three features does not mean all three features have to be used in touch pressure level determination for all users. For example, for a particular user, it is possible that only one of the features show strong correlation with the touch pressure, while the other two features show very weak or no correlation with the touch pressure. Using a classifier (which is discussed in detail below) trained for such a user to determine the touch pressure level may result in only one feature being actually factored into the determination of the touch pressure level. For another particular user, it is possible that two of the three features show fairly strong correlation with the touch pressure level, while the other one feature shows very weak or no correlation with the touch pressure. Using a classifier (which is discussed in detail below) trained for such a user to determine the touch pressure level may result in two of the three features being actually factored into the determination of the touch pressure level. For a third example user, it is possible that all three features show fairly strong correlation with the touch pressure level. Using a classifier (which is discussed in detail below) trained for such a user to determine the touch pressure level may result in all three features being actually factored into the determination of the touch pressure level.

In one embodiment, the area of the touch region may be normalized to remove the effect the angle of the finger touching the touchscreen has on the area variance. To normalize the area of the touch region, the width of the touch region may be held constant, and the height of the touch region may be adjusted such that the adjusted height-to-width ratio is equal to a predetermined maximum ratio, and the area of the adjusted touch region is the normalized area. The normalized area of the touch region may be used as a feature in itself in the determination of the touch pressure level. Furthermore, the normalized area of the touch region may be used in the calculation of the average capacitance, which is in turn used as a feature in the determination of the touch pressure level.

Figure 4:
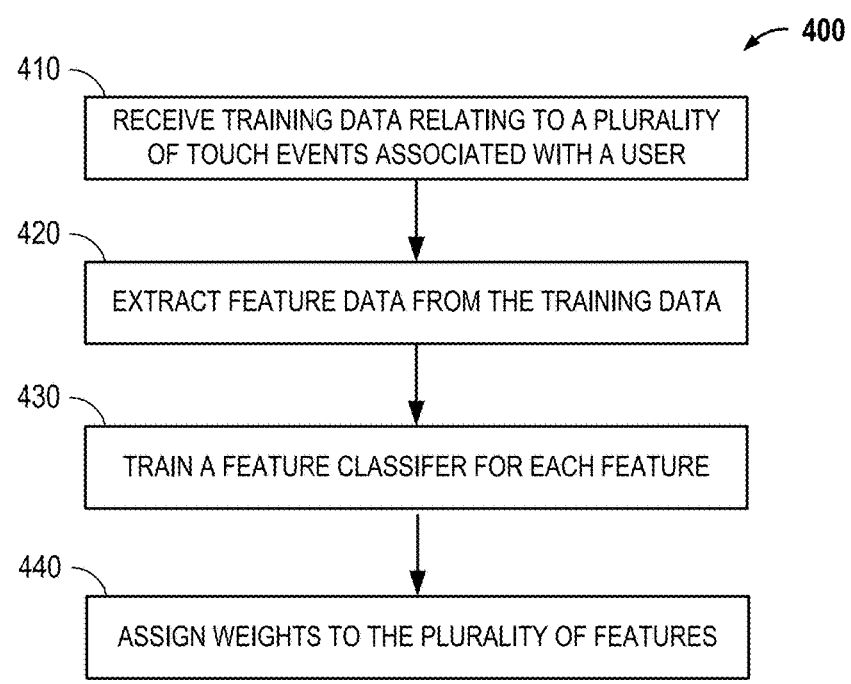
FIG. 4 is a flowchart illustrating an exemplary method for training an individual touch pressure level classifier.

Referring to FIG. 4, a flowchart illustrating an exemplary method 400 for training an individual touch pressure level classifier implemented with the device 100 is shown. At block 410, training data relating to a plurality of touch events associated with a user may be received at a touchscreen. The user may be instructed by a user interface to touch the touchscreen multiple times, each time with a particular touch pressure level (e.g., firm, natural, or light). Each touch may generate a touch event, and the data associated with the touch event may be received. At block 420, feature data relating to a plurality of features may be extracted from the training data relating to the plurality of touch events. Each touch event may be associated with a plurality of features, such as the average capacitance, the (normalized) area of the touch region, and the duration of the touch event. In other embodiments, different and/or additional features may be utilized in the determination of the touch pressure level. The data may be preprocessed with one or more data denoising methods, such as normalization, smoothing, etc. before the features are extracted. At block 430, a feature classifier may be trained for each feature based on the feature data extracted from the training data. Therefore, the plurality of features may correspond to a plurality of feature classifiers. In one embodiment, the feature classifier may be a Bayes Risk Classifier (BRC) that minimizes the Bayes risk. The Bayes risk may be defined as: $R(p|x)=\Sigma_j L_{ij} P(p_j|x)$, where $L_{ij}$ represents the potential loss (such as erroneous deletion of a significant amount of data) that may be incurred if the pressure level $p_i$ is the determined pressure level while the true pressure level is $p_j$, and $P(p_j|x)$ represents the posterior probability of the pressure level $p_j$ given the feature x. At block 440, weights may be assigned to the plurality of features to account for variability between users. In one embodiment, a boosting mechanism may be applied to assign the weights. Each feature may be assigned an individual weight. Because different features perform better in indicating the actual touch pressure level than others for different users, and no feature consistently performs better across different users, the boosting mechanism may assign an individualized weight distribution to the features based on the training data for a particular user to optimize the performance of the touch pressure level classifier for the user. It should be appreciated that if a feature shows very weak or no correlation with the touch pressure level for a particular user, the feature may be assigned a weight of zero (0) so that it is not factored into the determination of the touch pressure level for the user. Therefore, for a particular user, it is possible that based on the individualized weight distribution, the touch pressure level may be determined based on any number of the one or more features. In one embodiment, the weights may be estimated using the SAMME (Stagewise Additive Modeling using a Multi-class Exponential loss function) algorithm, the AdaBoost (Adaptive Boosting) algorithm, the LPboost (Linear Programming Boosting) algorithm, the TotalBoost algorithm, the BrownBoost algorithm, etc. The algorithm used to assign weights does not limit the disclosure.

Hereinafter feature classifier parameters and weights of the features associated with a particular user may be referred to, collectively, as a user profile. To accommodate multiple users on a same device, multiple user profiles may be individually established and stored on the device, such as the device 100.

Figure 5:
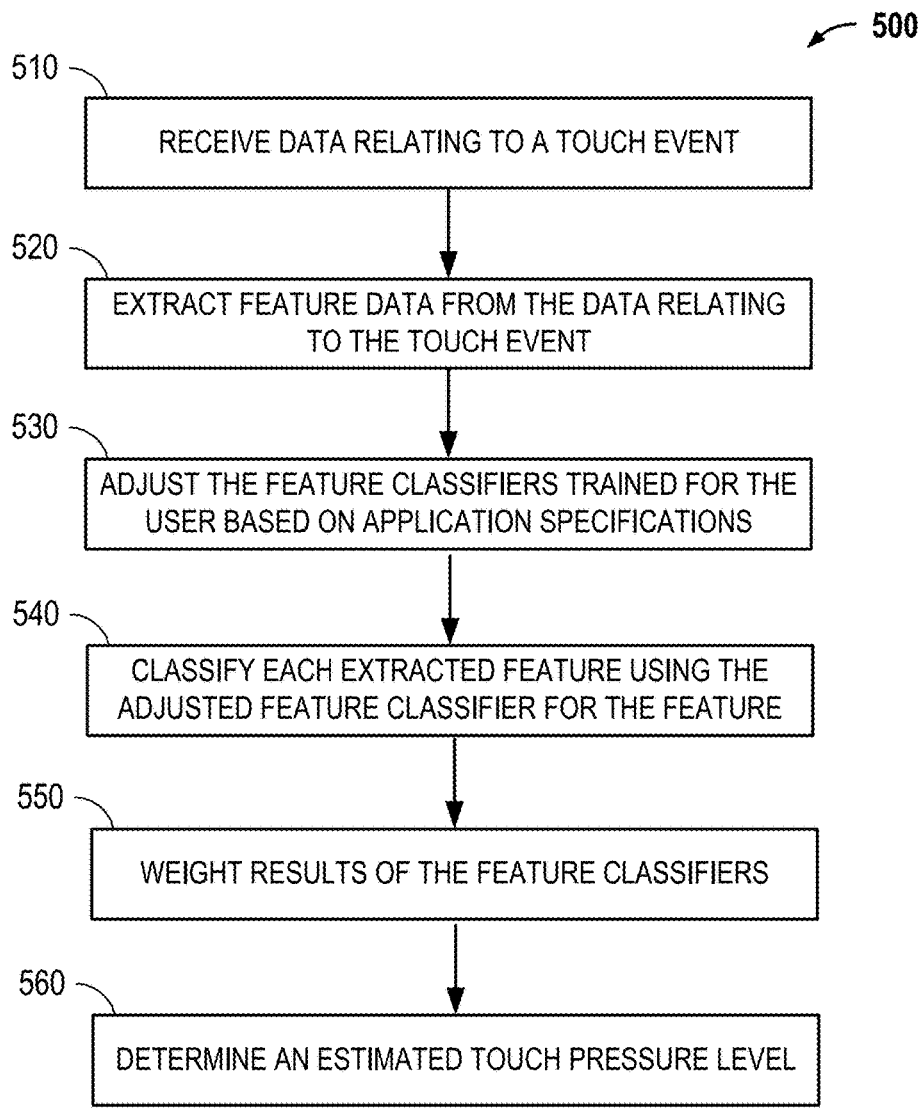
FIG. 5 is a flowchart illustrating an exemplary method for determining a touch pressure level using an individually trained touch pressure level classifier.

Referring to FIG. 5, a flowchart illustrating an exemplary method 500 for determining a touch pressure level using an individually trained touch pressure level classifier implemented with the device 100 is shown. The touch pressure level classifier used in the method 500 may be one trained with the method 400 of FIG. 4, as described above. If multiple user profiles are present on the device 100, the user may be prompted to select the user profile associated with herself. At block 510, data relating to a touch event may be received at a touchscreen. At block 520, feature data relating to a plurality of features may be extracted from the data relating to the touch event. The features may include the average capacitance, the (normalized) area of the touch region, and the duration of the touch event. The data may be preprocessed with one or more data denoising methods, such as normalization, smoothing, etc. before the features are extracted. At block 530, the feature classifiers trained for the user may be adjusted based on application or user interface specifications. The specification associated with the application or user interface currently in use may be activated. The application or the user interface may specify, through its corresponding specification, the number of touch pressure levels requiring detection (i.e., pressure level granularity) and the sensitivity to each of these touch pressure levels. The application or the user interface may also specify the potential loss (e.g., erroneous deletion of a significant amount of data) associated with different touch pressure level determinations. As described above, the feature classifiers may be adjusted to penalize the confidence level associated with the touch pressure levels that have the potential to cause great loss (i.e., risky touch pressure levels), thereby reducing the likelihood of false positives associated with these touch pressure levels, but not others. At block 540, each extracted feature is classified using the adjusted feature classifier for the feature. Each adjusted feature classifier provides confidence levels for different touch pressure levels while penalizing the confidence levels associated with the risky touch pressure levels. The output of a feature classifier may be referred to hereinafter as a feature classification. At block 550, results of the feature classifiers may be weighted using the weights established at block 440 of FIG. 4 for that particular user. At block 560, a final estimated touch pressure level may be determined using a final classifier. The final classifier may be a majority vote rule classifier in the form of $P(x)=\mathrm{argmax}_k \Sigma_{m=1}^M \alpha_k 1_{\{T^{(m)}(x)=k\}}$, where T(x) denotes a feature classifier decision. The touch pressure level associated with the maximum response under the majority vote rule classifier may be determined as the estimated touch pressure level. In one embodiment, the confidence level of the determined touch pressure level may also be provided.

Algorithms that utilize the determined touch pressure level and/or one or more features related to touch events to determine touch gestures have been contemplated. The touch gesture may be, for example, a "touch with the tip portion of a fingertip" touch gesture, a "touch with the flat portion of a fingertip" touch gesture, or a "touch with the right side of a fingertip" touch gesture, etc.

Figure 6A:
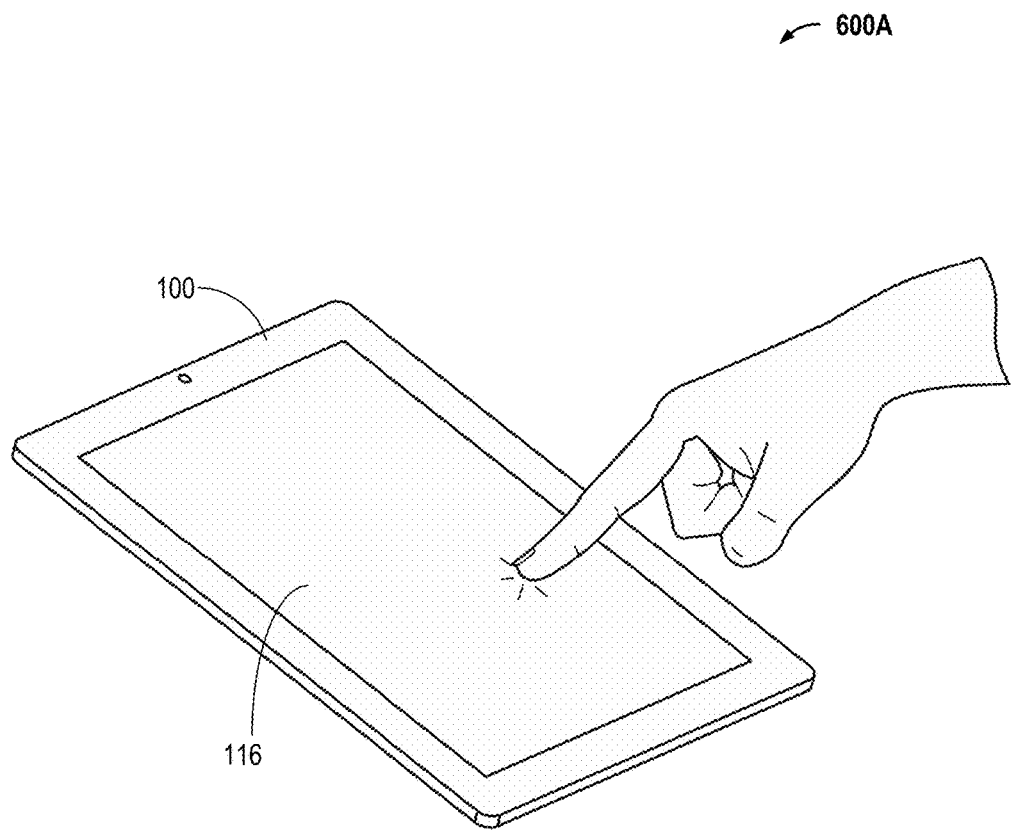
FIG. 6A illustrates an example user touch operation with a "touch with the tip portion of a fingertip" touch gesture.
Figure 6B:
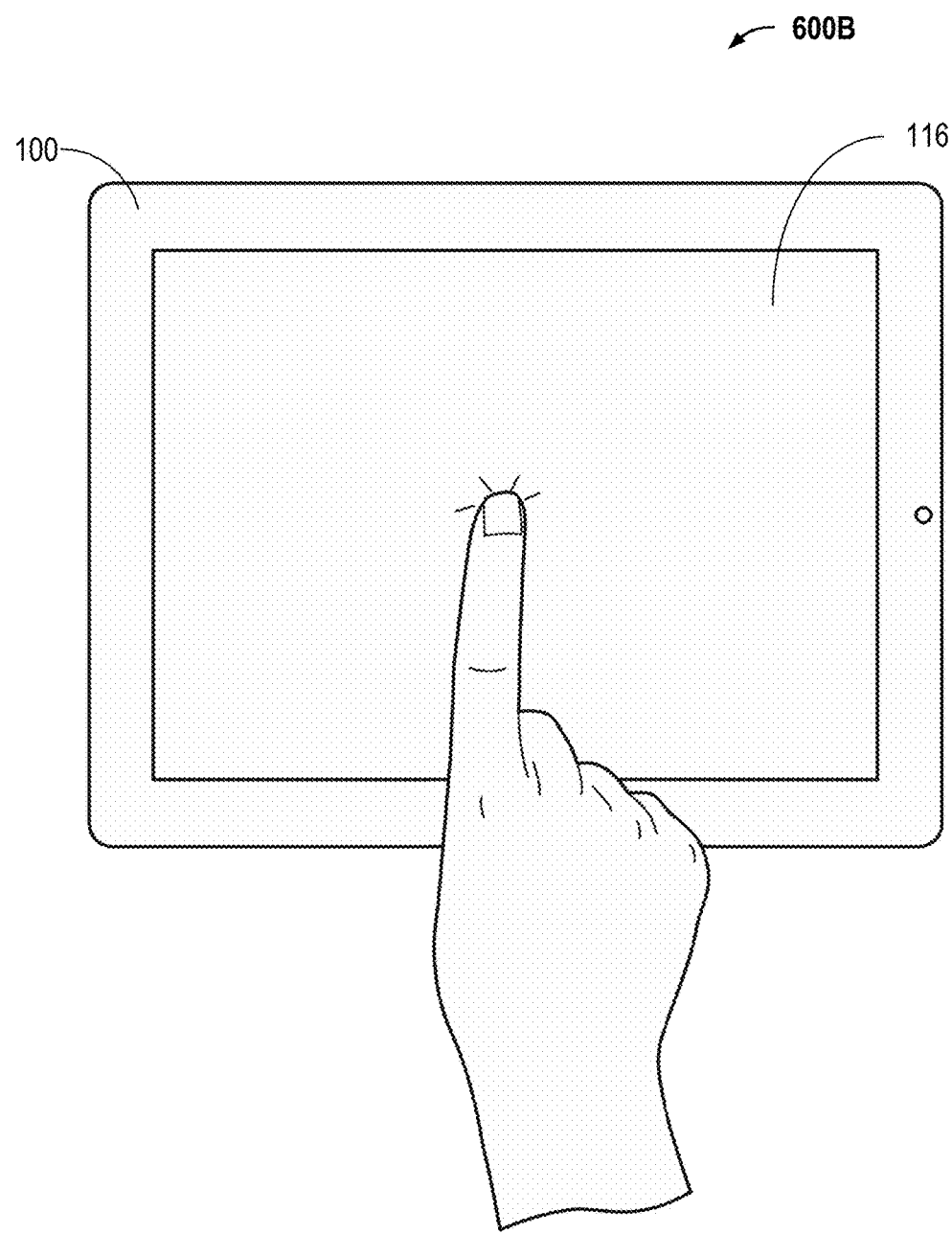
FIG. 6B illustrates an example user touch operation with a "touch with the flat portion of a fingertip" touch gesture.
Figure 6C:
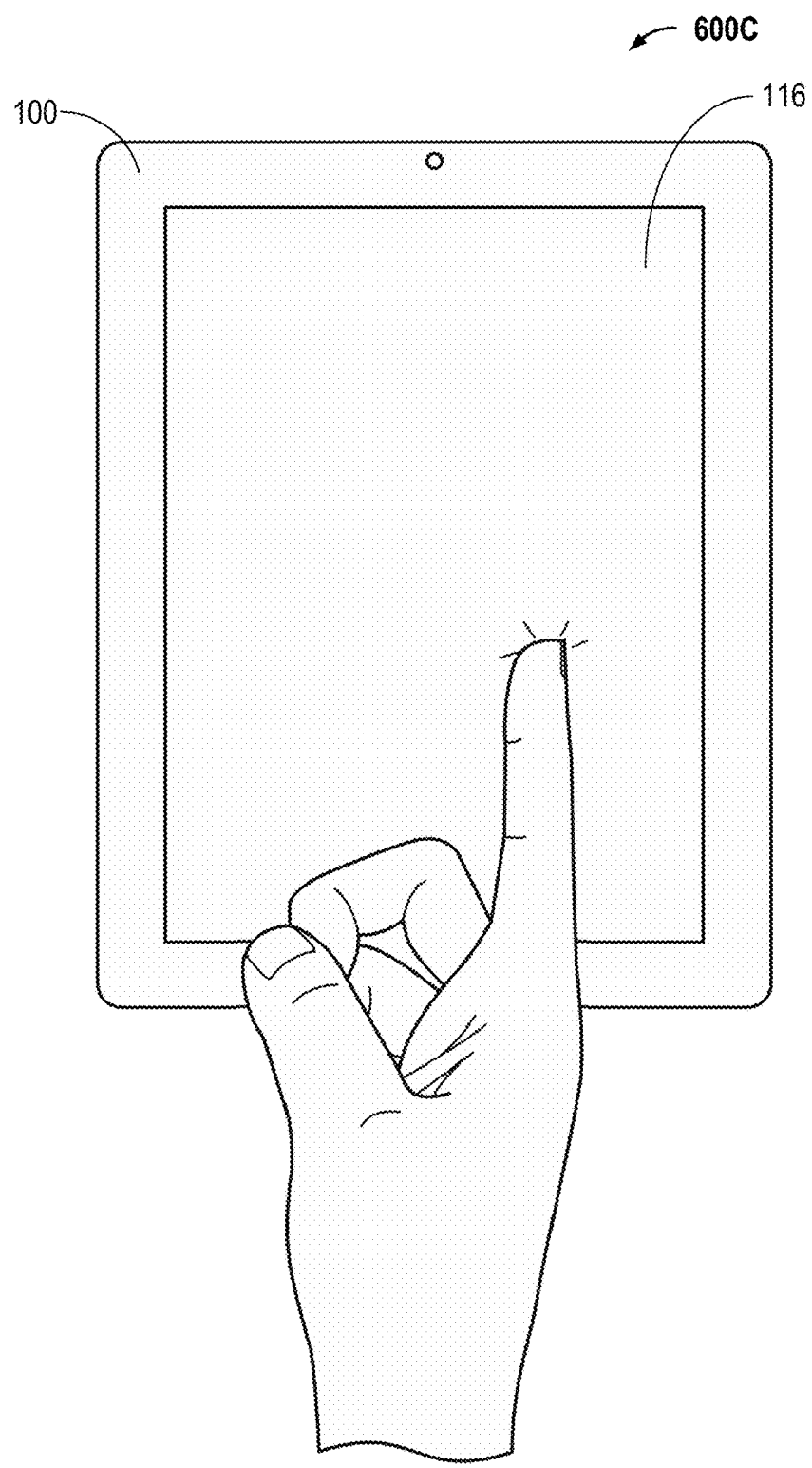
FIG. 6C illustrates an example user touch operation with a "touch with the right side of a fingertip" touch gesture.

Referring to FIGS. 6A-6C, example user touch operations with particular touch gestures are illustrated. FIG. 6A illustrates an example user touch operation with a "touch with the tip portion of a fingertip" touch gesture; FIG. 6B illustrates an example user touch operation with a "touch with the flat portion of a fingertip" touch gesture; and FIG. 6C illustrates an example user touch operation with a "touch with the right side of a fingertip" touch gesture.

Therefore, the determined touch pressure level and/or one or more features related to a touch event may be utilized to determine a touch gesture associated with the touch event.

Various implementations of an application or system that determines touch pressure levels on a touchscreen based on features related to the touch events have been previously described in detail. It should be appreciated that application or system that recognizes and/or makes use of touch pressure levels, as previously described, may be implemented as software, firmware, hardware, combinations thereof, etc. In one embodiment, the previous described functions may be implemented by one or more processors (e.g., processor 110) of a device 100 to achieve the previously desired functions (e.g., the method operations of FIGS. 2, 4, and 5). Various uses of touch triggers described hereinafter improve general usability of touchscreen-equipped devices and provide better user experiences on these devices.

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for determining a touch pressure level on a touchscreen, comprising:
   detecting a touch event by the touchscreen;
   obtaining data relating to features associated with the touch event, the features comprising an average capacitance value of the touch event, a touch area of the touch event, and a touch duration of the touch event, wherein the average capacitance value is based on a plurality of capacitance values of the touch event; and
   determining a touch pressure level for the touch event based on one or more of the features, wherein for each of the one or more features, a respective feature classifier and weight is established for a particular user based on training data associated with the particular user,
   wherein determining the touch pressure level comprises:
   classifying each of the one or more of the features using the respective feature classifier for the particular user to provide a corresponding confidence level for each of a plurality of different touch pressure levels; and
   estimating the touch pressure level using a majority vote rule classifier based on the confidence levels provided by the feature classifiers and the weights associated with the one or more features for the particular user.

2. The method of claim 1, further comprising normalizing the touch area by adjusting a height of the touch area relative to a width of the touch area.

3. The method of claim 1, wherein the feature classifier is a Bayes Risk Classifier (BRC), and the weights are established using a boosting mechanism.

4. The method of claim 3, wherein the weight for at least one feature is zero.

5. The method of claim 1, wherein a confidence level associated with a risky touch pressure level is penalized in the feature classifier.

6. The method of claim 1, wherein establishing feature classifiers for a particular user comprises:
   receiving training data relating to a plurality of touch events associated with the user;
   extracting feature data from the training data; and
   establishing the feature classifiers based on the feature data.

7. The method of claim 1, further comprising adjusting the respective feature classifiers, based on an application specification of an application that is currently in use, to obtain respective adjusted feature classifiers,
   wherein the classifying each feature of the one or more of the features is performed using the respective adjusted feature classifiers,
   wherein the application specification includes at least one value that specifies a configuration setting.

8. The method of claim 7, wherein the application specification specifies a touch pressure level detection granularity.

9. The method of claim 7, wherein the application specification specifies a risk associated with a particular touch pressure level.

10. The method of claim 1, wherein the determined touch pressure level is further used to determine a touch gesture.

11. An apparatus for determining a touch pressure level on a touchscreen, comprising:
   a memory; and
   a processor coupled to the memory, the processor configured to:
      detect a touch event by the touchscreen,
      obtain data relating to features associated with the touch event, the features comprising an average capacitance value of the touch event, a touch area of the touch event, and a touch duration of the touch event, wherein the average capacitance value is based on a plurality of capacitance values of the touch event;
      and
      determine a touch pressure level for the touch event based on one or more of the features, wherein for each of the one or more features, a respective feature classifier and weight is established for a particular user based on training data associated with the particular user,
   wherein the processor configured to determine the touch pressure level is configured to:
      classify each feature of the one or more of the features using the respective feature classifier for the particular user to provide a corresponding confidence level for each of a plurality of different touch pressure levels, and
      estimate the touch pressure level using a majority vote rule classifier based on the confidence levels provided by the feature classifiers and the weights associated with the one or more features for the particular user.

12. The apparatus of claim 11, wherein the processor is further configured to normalize the touch area by adjusting a height of the touch area relative to a width of the touch area.

13. The apparatus of claim 11, wherein the feature classifier is a Bayes Risk Classifier (BRC), and the weights are established using a boosting mechanism.

14. The apparatus of claim 13, wherein the weight for at least one feature is zero.

15. The apparatus of claim 11, wherein a confidence level associated with a risky touch pressure level is penalized in the feature classifier.

16. The apparatus of claim 11, wherein the processor configured to establish feature classifiers for a particular user is configured to:
  receive training data relating to a plurality of touch events associated with the user,
  extract feature data from the training data, and
  establish the feature classifiers based on the feature data.

17. The apparatus of claim 11, wherein the processor is further configured to adjust the respective feature classifiers, based on an application specification of an application that is currently in use, to obtain respective adjusted feature classifiers,
  wherein the processor configured to classify each of the one or more of the features is configured to classify each of the one or more features using the respective adjusted features classifiers,
  wherein the application specification includes at least one value that specifies a configuration setting.

18. The apparatus of claim 17, wherein the application specification specifies a touch pressure level detection granularity.

19. The apparatus of claim 17, wherein the application specification specifies a risk associated with a particular touch pressure level.

20. The apparatus of claim 11, wherein the determined touch pressure level is further used to determine a touch gesture.

21. An apparatus for determining a touch pressure level on a touchscreen, comprising:
  means for detecting a touch event by the touchscreen;
  means for obtaining data relating to features associated with the touch event, the features comprising an average capacitance value of the touch event, a touch area of the touch event, and a touch duration of the touch event, wherein the average capacitance value is based on a plurality of capacitance values of the touch event, and
  means for determining a touch pressure level for the touch event based on one or more of the features, wherein for each of the one or more features, a respective feature classifier and weight is established for a particular user based on training data associated with the particular user,
  wherein the means for determining the touch pressure level comprises:
  means for classifying each of the one or more of the features using the respective feature classifier for the particular user to provide a corresponding confidence level for each of a plurality of different touch pressure levels; and
  means for estimating the touch pressure level using a majority vote rule classifier based on the confidence levels provided by the feature classifiers and the weights associated with the one or more features for the particular user.

22. The apparatus of claim 21, wherein the feature classifier is a Bayes Risk Classifier (BRC), and the weights are established using a boosting mechanism.

23. The apparatus of claim 21, wherein the means for establishing feature classifiers for a particular user comprises:
  means for receiving training data relating to a plurality of touch events associated with the user;
  means for extracting feature data from the training data; and
  means for establishing the feature classifiers based on the feature data.

24. A non-transitory computer-readable medium comprising code which, when executed by a processor, causes the processor to perform a method comprising:
  detecting a touch event by the touchscreen;
  obtaining data relating to features associated with the touch event, the features comprising an average capacitance value of the touch event, a touch area of the touch event, and a touch duration of the touch event, wherein the average capacitance value is based on a plurality of capacitance values of the touch event;
  and
  determining a touch pressure level for the touch event based on one or more of the features, wherein for each of the one or more features, a respective feature classifier and weight is established for a particular user based on training data associated with the particular user,
  wherein the code for determining the touch pressure level comprises:
  code for classifying each of the one or more of the features using the respective feature classifier for the particular user to provide a corresponding confidence level for each of a plurality of different touch pressure levels; and
  code for estimating the touch pressure level using a majority vote rule classifier based on the confidence levels provided by the feature classifiers and the weights associated with the one or more features for the particular user.

25. The non-transitory computer-readable medium of claim 24, wherein the feature classifier is a Bayes Risk Classifier (BRC), and the weights are established using a boosting mechanism.

26. The non-transitory computer-readable medium of claim 24, wherein the code for establishing feature classifiers for a particular user comprises:
  code for receiving training data relating to a plurality of touch events associated with the user;
  code for extracting feature data from the training data; and
  code for establishing the feature classifiers based on the feature data.

* * * * *